Nov. 11, 1941.                M. E. REAGAN                    2,262,652
                          LOCKED ROTOR PROTECTOR
                          Filed Feb. 13, 1940
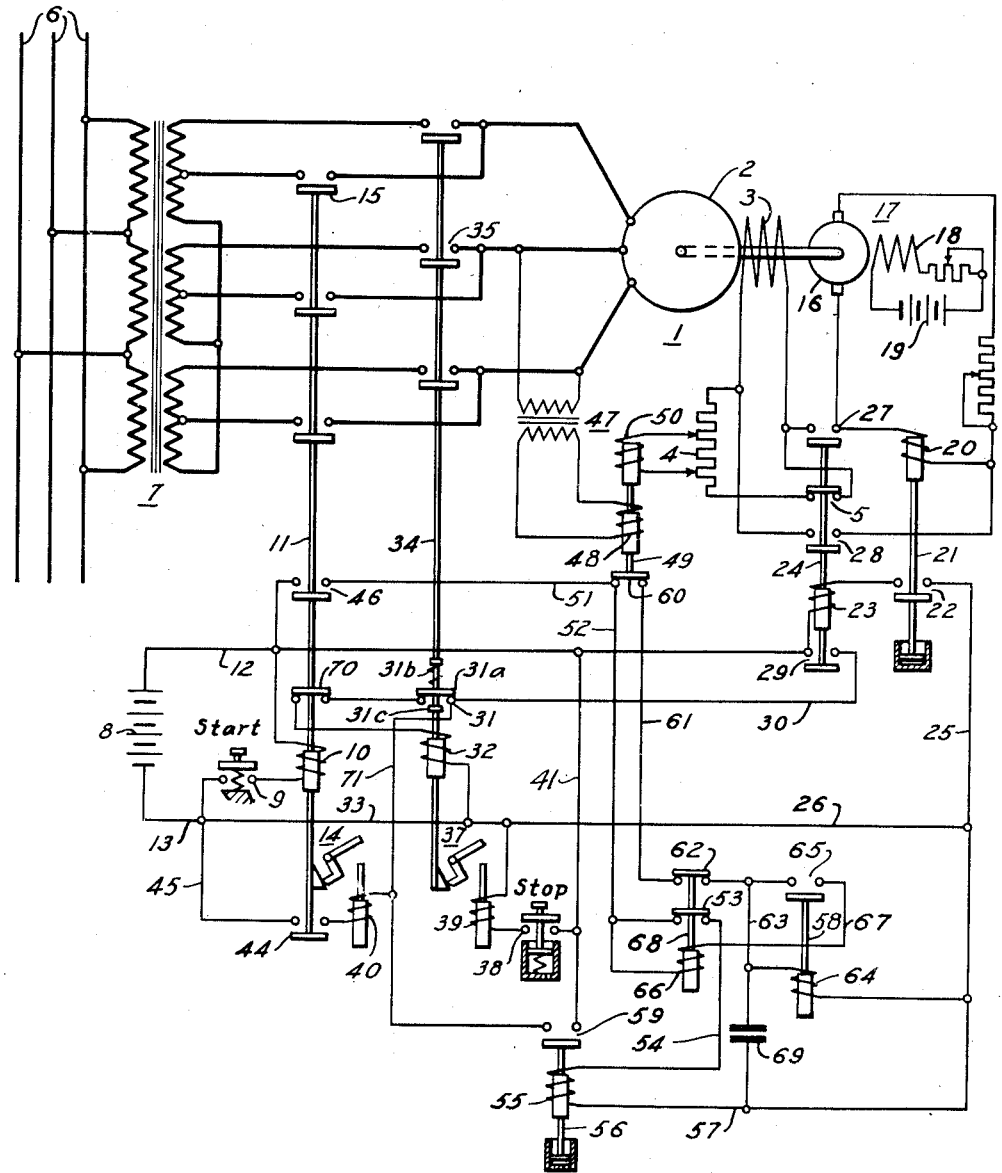
WITNESSES:                                                    INVENTOR
                                                         Maurice E Reagan
                                                               BY
                                                         Paul E. Friedemann
                                                              ATTORNEY Patented Nov. 11, 1941

2,262,652

UNITED STATES PATENT OFFICE 2,262,652

LOCKED ROTOR PROTECTOR

Maurice E. Reagan, Wilkinsburg, Pa., assignor to Westinghouse Electric & Manufacturing Company, East Pittsburgh, Pa., a corporation of Pennsylvania Application February 13, 1940, Serial No. 318,734

7 Claims. (Cl. 172—289)

My invention relates to a protective system for an electrical motor which is designed to interrupt the energizing potential thereto in the event that the motor does not start to rotate after a predetermined time interval following the application of energizing potential thereto.

An object of my invention is to provide a protective system for an electric motor which will respond almost immediately after the application of energizing potential to the motor to interrupt the energizing circuit in the event that the rotor of the motor fails to start its rotation.

Another object of my invention is to provide a locked rotor protective system for a synchronous motor which is responsive within an exceedingly short interval, namely, one slip cycle, to interrupt the energizing circuit in the event that the rotor fails to start its rotation immediately following the application of energizing potential to the armature winding.

Other objects and advantages will become more apparent from a study of the following specification when considered in conjunction with the accompanying drawing, in which the single figure is a schematic showing of a synchronous motor control system embodying the locked rotor feature of my invention.

Referring more particularly to the single figure, numeral 1 denotes a synchronous motor having an armature or stator 2 and field winding or rotor 3. The field winding 3 is normally short-circuited during starting of the motor 1 by a discharge resistor 4 through the closed contact members 5 of relay 24. Numeral 6 denotes the busses of a three-phase supply source for energizing a three-phase transformer 7. A direct current source of supply, indicated as a battery 8 is used to energize the control system. Of course such source could equally well be derived from the busses 6 of the alternating current supply by a suitable rectifier (not shown).

Assume that the control system is in the deenergized condition, such as shown in the drawing, and that it is desired to start motor 1. The "start" pushbutton is depressed, thereby closing contact members 9, thus completing a circuit through the actuating coil 10 of line contactor (or starting contactor) 11, which may be traced from the positive conductor 12, through actuating coil 10, contact members 9, to the negative conductor 13. After contactor 11 has been actuated, an associated latch member 14 will lock it in its upper or closed position, thereby permitting release of the "start" pushbutton without affecting line contactor 11. Contact members 15 of line contactor 11 are thus closed, thereby completing an energizing circuit extending from the secondary of the transformer 7 to the armature 2 of the synchronous motor, thereby starting rotation of the armature if the operation of the device is normal. As armature 2 rotates, there rotates with it an armature 16, mechanically coupled thereto, of an exciter 17, which exciter has a field winding 18 energized by a suitable direct current source 19. It will be apparent that as the speed of the armatures 2 and 16 increases, the terminal voltage of armature 16 will gradually increase until it has sufficiently energized actuating coil 20 so as to cause actuation of time delay relay 21. The time involved in effecting actuation of time delay relay 21 allows armature 2 of the synchronous motor to come up to almost synchronous speed, at which time contact members 22 close, completing an energizing circuit through actuating coil 23 of relay 24 which may be traced from conductor 12 to actuating coil 23, contact members 22, conductors 25, 26 and 33, to conductor 13. Actuation of the relay 24 will open contact members 5 thereof, thus interrupting the short-circuit path through the discharge resistor 4 and at the same time will complete a direct current energizing circuit for field winding 3 through the closed contact members 27 and 28 which will be readily apparent from the drawing. Actuation of relay 24 also closes contact members 29, thereby completing two circuits. The first circuit may be traced from conductor 12 through contact members 29, conductor 30 through conductor 71, trip coil 40, contact members 44, conductor 45 to conductor 13. Energization of trip coil 40 will effect unlatching of latch member 14 and dropping out of starting or line contactor 11 to close contact members 70. The second circuit may be traced from conductor 12 through contact members 29, conductor 30, contact members 31, contact members 70, actuating coil 32, conductor 33, to conductor 13, which will effect energization of coil 32 and actuation of contactor 34.

The bridging contact member 31a is slidable on the stem of contactor 34 and is rigidly secured thereto through spring 31b and is so arranged that a collar 31c, rigidly connected to the stem, does not strike 31a to effect lifting thereof until almost the limit of upward travel of the stem. Contact members 35 of contactor 34 will now close and remain in the closed position by virtue of a latch 37 similar to latch 14. As contactor 11 drops out, it opens its respective contact members 15, 46 and 44. The armature energizing circuit, however, still remains closed through contact member 35.

Assume now that after continued operation of the motor at synchronous speed, it is desired to stop the same. The "stop" pushbutton is depressed, thus closing contact members 38 which complete an energizing circuit through trip coil 39 which effects unlatching of the latch 37 which will allow the plunger of contactor 34 to move downwardly and open its respective contact members, including contact members 35, thus interrupting the energizing circuit for armature 2. Armature 2, together with armature 16, coupled thereto, will now decrease in speed, and after a predetermined time, the voltage across actuating coil 20 will decrease to such an extent as to cause relay 21 to drop out, thus opening contact members 22 thereof which will interrupt the energizing circuit through actuating coil 23 and effect dropping out of relay 24, thereby reestablishing the short-circuited connection of field winding 3 through the discharge resistor 4, and at the same time opening the direct-current energizing circuit for field winding 3. A dashpot arrangement on the stop pushbutton will maintain contact members 38 closed for a sufficient time after depression of the "stop" pushbutton in order to allow sufficient time for the above described operation of relays 21 and 24.

Most of the above described system is well-known in the art. The following protective system embodies the essence of my invention. My invention is specifically directed to a protective system which will guard against continued application of energizing potential to the armature in the event that the rotor fails to start to rotate after a predetermined time following depression of the start pushbutton. Such situations are sometimes encountered, especially in the starting of large electric motors wherein, for one reason or another, such as high inertia of the parts, or friction to be overcome in starting up an electric motor, the rotor of the motor will fail to start to rotate despite the application of energizing potential to the armature. In the absence of a protective scheme for such situation, it will be readily apparent that the motor armature will overheat, particularly since it is at rest and no cooling is provided, such as is normally provided by the rotation of the rotor. As a result of this, the damper winding and transformer windings and other associated parts may become damaged, thus damaging the entire system. In accordance with my invention, a transformer 47 is energized from one of the phases of the energizing supply circuit, which transformer energizes an actuating coil 48 of a relay 49. Relay 49 is also actuated by an actuating coil 50 which is energized from a portion of the discharge resistor 4. Actuating coil 50 is wound oppositely with respect to actuating coil 48, when considered with reference to a given position of the rotor to the stator. In other words, relay 49 is differentially energized, that is, energized by the slip frequency between the frequency applied to the armature 2 and the frequency induced in the short-circuited field winding 3 as a result of starting up of rotor 2. Of course, at the instant of start of the motor 1, the frequencies of the voltages impressed on coils 48 and 50 are the same. Hence, the slip frequency is equal to line frequency. As the motor comes up to speed, the wave-length of the slip voltage becomes greater and greater; that is, the frequency becomes smaller and smaller. Relay 49 may or may not pick up as the result of closing of contact members 15, that is, as a result of completion of the energizing circuit for armature 2, inasmuch as the phase relation of primary or armature voltage with respect to the secondary or field voltage on the slip rings, or terminals, may vary from "in-phase" to 180° out of phase at the instant of closing of the contact members 15, due to the position of the armature at rest with respect to the poles formed by its field windings 3.

There are thus four possible conditions at the starting of the motor:

A. The currents in coils 48 and 50 are out of phase and the rotor fails to start rotating;
B. The currents in coils 48 and 50 are in phase and the rotor fails to rotate;
C. The currents in coils 48 and 50 are out of phase and the rotor starts rotating; or
D. The currents in coils 48 and 50 are in phase and the rotor starts rotating.

To prevent damage to the system, it is thus important to open contact members 15 if the motor fails to start. This is done by energizing trip coil 40. The time limit relay provides such emergency energizing circuit through conductor 41 and contact members 59 to coil 40. The time limit relay 56 is thus provided with a time constant that is short enough to prevent any damage to the system.

For conditions A and B, when the rotor fails to start rotating, it is important that coil 55 remain energized to close contact members 59, and for conditions C and D, when the rotor starts, that coil 55 be deenergized.

It will be noted that the only control contact members (as distinguished from contact members 46) in series with coil 55 are the contact members 53.

My protective control is thus accomplished if contact members 53 remain closed for conditions A and B, respectively and are opened for conditions C and D, respectively.

Operation of the "start" pushbutton effects completion of the energization circuit for armature 2 and the closure of contact members 46. A circuit is thus established from conductor 12 through contact members 46, conductors 51 and 52, contact members 53 of control relay 68, conductor 54, actuating coil 55 of time limit relay 56, and conductors 57, and 26 to negative conductor 13. This last recited circuit will be the same, at the instant of start, for all four conditions A, B, C and D, respectively.

*Condition A*

For condition A, the currents in coils 48 and 50 are out of phase. The relay 49 thus fails to pick up and contact members 60 remain closed indefinitely. A circuit is thus established from conductor 51, through contact members 60, conductor 61, contact members 62, conductor 63, actuating coil 64 to negative conductor 26. In a very short time, depending on the capacity of condenser 69, coil 64 effects closure of contact members 65. However, since contact members 60 remain closed, coil 66 is short circuited through contact members 60, 62 and 65, and contact members 53 thus remain closed.

*Condition B*

For condition B the currents in coils 48 and 50 are in phase and relay 49 thus picks up and contact members 60 remain open indefinitely. Coil 64 can thus not be energized and contact members 65, the only control contact members in series with coil 66 of control relay 68, remain open indefinitely. Coil 66 is not energized and contact members 53 remain closed.

*Condition C*

For condition C, the currents in coils 48 and 50 are out of phase. This means that a circuit is established through contact members 60, conductor 61, contact members 62, conductor 63 to coil 64. The control relay thus closes contact members 65. As soon as the rotor starts rotating the current in coils 48 and 50 is first changed from an out-of-phase condition to an in-phase condition, and then again to an out-of-phase condition, and then again to an in-phase condition, and so on.

During the first in-phase condition, contact members 60 are opened and the condenser discharge maintains coil 64 energized long enough to hold contact members 65 closed to establish an energizing circuit for coil 66. This circuit may be traced from conductor 52 through coil 66, conductor 67, contact members 65, conductor 63, and coil 64 to negative conductor 26. Relay 68 operates and contact members 53 open.

Since contact members 62 are also opened, the very next closure of contact members 60 does not short circuit coil 66, and both coils 64 and 66 remain energized. The starting of the motor thus proceeds normally.

*Condition D*

For condition D, the currents in coils 48 and 50 are in phase. Contact members 60 are thus, at the instant of start, open. As soon as the rotor starts rotating the current in coils 48 and 50 is first changed from an in-phase condition to an out-of-phase condition, and then again to an in-phase condition, and then again to an out-of-phase condition, and so on.

During the first out-of-phase condition, contact members 60 close. Coil 64 is thus energized as explained under condition C. Since the motor keeps rotating the currents in coils 48 and 50 will presently have a second in-phase condition, whereupon contact members 60 are opened and the condenser discharge maintains coil 64 energized long enough to effect energization of coil 66 by the same circuit traced under condition C. Relay 68 operates and contact members 53 open.

Since, as pointed out under condition C, contact members 62 are opened and coils 66 and 64 remain energized, the starting of the motor proceeds normally.

I am, of course, aware that others, particularly after having had the benefit of the teachings of my invention, may devise other devices and systems of control embodying my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A control system comprising, in combination, a synchronous machine having an armature and a field winding constituting the stator and rotor, a source of alternating current potential for said armature, switching means for completing an energizing circuit from said source to said armature for effecting rotation of the rotor, means for short circuiting said field winding during the starting period of said machine, time delay means for effecting opening of said switching means, control means including a relay having two separate cores each having a coil wound therearound for controlling operation of said time delay means, and responsive to a predetermined relationship between said voltage applied to the armature and the induced voltage in the field winding during starting of said machine and to a relationship 180° out of phase with respect to said predetermined relationship, said control means allowing said time delay means to open said switching means when said rotor fails to rotate following energization of said armature, but which renders said time delay means inoperative to open said switching means when said rotor rotates following such energization.

2. A control system comprising, in combination, a synchronous machine having an armature and a field winding constituting the stator and rotor, a source of alternating current potential for said armature, switching means for completing an energizing circuit from said source to said armature for effecting rotation thereof, means for short circuiting said field winding during the starting period of said machine, time delay means for effecting opening of said switching means, relay means for controlling the operation of said time delay means, and responsive to a predetermined relationship between said voltage applied to the armature and the induced voltage in the field winding during starting of said motor, said relay means allowing said time delay means to open said switching means when said rotor fails to rotate following energization of the armature, but which renders said time delay means inoperative to open said switching means when said rotor rotates following such energization, and means retaining said control function of said relay means irrespective of whether or not said relay means is operated at the moment of closing of said switching means.

3. A control system comprising, in combination, a synchronous machine having an armature and a field winding constituting the stator and rotor, a source of alternating current potential for said armature, switching means for completing an energizing circuit from said source of said armature for effecting rotation of the rotor, means for short circuiting said field winding during the starting period of said machine, time delay means for effecting opening of said switching means, relay means for controlling operation of said time delay means, and responsive to a predetermined relationship between said voltage applied to the armature and the induced voltage in the field winding during starting of said motor, said relay means allowing said time delay means to open said switching means when said rotor fails to rotate following energization of the armature, but which renders said time delay means inoperative to open said switching means when said rotor rotates following such energization, an auxiliary relay, which when energized, effects interruption of the circuit through said time delay means, a condenser connected in parallel with the actuating coil of said auxiliary relay and which is charged in the event said first mentioned relay has been actuated upon closing of said switching means, thereby producing a time delay in the energization of said auxiliary relay actuating coil, making it inoperative to interrupt the circuit through the time delay relay until the lapse of a predetermined time interval.

4. A control system comprising, in combination, a synchronous machine having an armature and a field winding constituting the stator and rotor, a source of alternating current potential for said armature, switching means for completing an energizing circuit from said source to said armature for effecting rotation of the rotor, time delay means automatically initiated upon closing of said switching means for effecting opening thereof after the lapse of a predetermined time period, a differential relay which is energized by a differential flux which is a function of the voltage applied to the armature and the voltage induced in the field winding during starting of said machine, a pair of relays which are electrically interlocked in a manner to interrupt the circuit through said time delay means before the lapse of said predetermined time period to prevent operation of said switching means only in the event that said rotor rotates shortly after energization of the armature irrespective of the phase relationship existing between the voltage applied to the armature and the voltage induced in the field winding.

5. A control system comprising, in combination, a synchronous machine having an armature and a field winding constituting the stator and rotor, a source of alternating current potential for said armature, switching means for completing an energizing circuit from said source to said armature for effecting rotation of the rotor, time delay means automatically initiated upon closing of said switching means for effecting opening thereof after the lapse of a predetermined time period, a differential relay which is energized by a differential flux which is a function of the voltage applied to the armature and the voltage induced in the field winding during starting of said machine, a pair of relays which are electrically interlocked in a manner to interrupt the circuit through said time delay means before the lapse of said predetermined time period to prevent operation of said switching means only in the event that said rotor rotates shortly after energization of the armature irrespective of the phase relationship existing between the voltage applied to the armature and the voltage induced in the field winding and a condenser connecting in parallel with the actuating coil of one of said pair of relays in order to provide a slight time lag in the operation thereof.

6. A control system comprising, in combination, a synchronous machine having an armature and a field winding constituting the stator and rotor, a source of alternating current potential for said armature, switching means for completing an energizing circuit from said source to said armature for effecting rotation of the rotor, time delay means automatically initiated upon closing of said switching means for effecting opening thereof after the lapse of a predetermined time period, a differential relay which is energized by a differential flux which is a function of the voltage applied to the armature and the voltage induced in the field winding during starting of said machine, relay means which is effective to interrupt the circuit through said time delay means before the lapse of said predetermined time period, provided said rotor rotates, irrespective of the phase relationship existing between the voltages impressed on said differential relay, said relay means being ineffective to interrupt said circuit through said time delay means in the event said rotor rotates within said predetermined time period.

7. A control system comprising, in combination, a synchronous machine having an armature and a field winding constituting the stator and rotor, a source of alternating current potential for said armature, switching means for completing an energizing circuit from said source to said armature for effecting rotation of the rotor, time delay means automatically initiated upon closing of said switching means for effecting opening thereof after the lapse of a predetermined time period, a differential relay which is energized by a differential flux which is a function of the voltage applied to the armature and the voltage induced in the field winding during starting of said machine, a pair of relays which are electrically interlocked in a manner to interrupt the circuit through said time delay means before the lapse of said predetermined time period to prevent operation of said switching means only in the event that said rotor rotates shortly after energization of the armature irrespective of the phase relationship existing between the voltage applied to the armature and the voltage induced in the field winding, one of said pair of relays including a time delay means to provide a lag in its responsiveness to said differential relay.

MAURICE E. REAGAN.